US007403202B1

(12) United States Patent
Nash

(10) Patent No.: US 7,403,202 B1
(45) Date of Patent: Jul. 22, 2008

(54) COMPUTER ANIMATION OF SIMULATED CHARACTERS USING COMBINATIONS OF MOTION-CAPTURE DATA AND EXTERNAL FORCE MODELLING OR OTHER PHYSICS MODELS

(75) Inventor: Shawn P. Nash, Orlando, FL (US)

(73) Assignee: Electronic Arts, Inc., Redwood City, CA (US)

( * ) Notice: Subject to any disclaimer, the term of this patent is extended or adjusted under 35 U.S.C. 154(b) by 0 days.

(21) Appl. No.: 11/195,574

(22) Filed: Aug. 1, 2005

Related U.S. Application Data

(63) Continuation of application No. 11/180,978, filed on Jul. 12, 2005, now abandoned.

(51) Int. Cl.
*G06T 15/70* (2006.01)
(52) U.S. Cl. ...................................... 345/474; 345/952
(58) Field of Classification Search ................. 345/957, 345/952, 953
See application file for complete search history.

(56) References Cited

U.S. PATENT DOCUMENTS

| | | | | | |
|---|---|---|---|---|---|
| 5,982,389 | A | * | 11/1999 | Guenter et al. | 345/474 |
| 6,191,798 | B1 | * | 2/2001 | Handelman et al. | 345/473 |
| 6,661,420 | B2 | * | 12/2003 | Arai et al. | 345/474 |
| 2003/0179205 | A1 | * | 9/2003 | Smith et al. | 345/474 |
| 2003/0227453 | A1 | * | 12/2003 | Beier et al. | 345/419 |
| 2004/0169656 | A1 | * | 9/2004 | Piponi et al. | 345/473 |

OTHER PUBLICATIONS

Lucas Kovar, Michael Gleicher, Frédéric Pighin, "Motion Graphs," Jul. 2002, ACM Transactions on Graphics (TOG), v.21 n.3, p. 473-482.*
Ari Shapiro, Fred Pighin, Petros Faloutsos, "Hybrid Control for Interactive Character Animation," Oct. 8, 2003, Proceedings of the 11th Pacific Conference on Computer Graphics and Applications, p. 455.*
Victor Brian Zordan, Jessica K. Hodgins, "Motion capture-driven simulations that hit and react," Jul. 21, 2002, Proceedings of the 2002 ACM SIGGRAPH/Eurographics Symposium on Computer Animation, p. 89-96, 193.*
Victor Brian Zordan, Nicholas C. Van Der Horst, "Mapping Optical Motion Capture Data to Skeletal Motion using a Physical Model," Jul. 26, 2003, Proceedings of the 2003 ACM SIGGRAPH/Eurographics Symposium on Computer Animation, p. 245-250.*
Lucas Kovar, Michael Gleicher, Frédéric Pighin, "Motion Graphs," Jul. 2002, ACM Transactions on Graphics (TOG), v.21 n.3, p. 473-482.*
Ari Shapiro, Fred Pighin, Petros Faloutsos, "Hybrid Control for Interactive Character Animation," Oct. 8, 2003, Proceedings of the 11th Pacific Conference on Computer Graphics and Applications, p. 455.*
Victor Brian Zordan, Jessica K. Hodgins, "Motion capture-driven simulations that hit and react," Jul. 21, 2002, Proceedings of the 2002 ACM SIGGRAPH/Eurographics Symposium on Computer Animation, p. 89-96, 193.*
Victor Brian Zordan, Nicholas C. Van Der Horst, "Mapping Optical Motion Capture Data to Skeletal Motion using a Physical Model," Jul. 26, 2003, Proceedings of the 2003 ACM SIGGRAPH/Eurographics Symposium on Computer Animation, p. 245-250.*
Victor Brian Zordan, Anna Majkowska, Bill Chiu, Matthew Fast, "Dynamic Response for Motion Capture Animation," Jul. 2005, ACM Transactions on Graphics (TOG), vol. 24, No. 3, p. 697-701.*
Marek Teichmann and Seth Teller, "Assisted Articulation of Closed Polygonal Modules," Sep. 1998, In 9th Eurographics Workshop on Animation and Simulation [online], [retrieved on Sep. 12, 2007]. Retrieved from the Internet: <URL:http://citeseer.ist.psu.edu/teichmann98assisted.html>.*
Victor Brian Zordan, Anna Majkowska, Bill Chiu, Matthew Fast, "Dynamic Response for Motion Capture Animation," Jul. 2005, ACM Transactions on Graphics (TOG), vol. 24, No. 3, p. 697-701.*
Badler et al., "Simulating Humans", *Department of Computer and Information Science*, University of Pennsylvania. (Oxford University Press, Inc. 1993), pp. 12-15, 34-38, 67-98.
Baraff, "An Introduction to Physically Based Modeling—Rigid Body Simulation I—Unconstrained Rigid Body Dynamics", pp. D32-D68, Online SIGGRAPH Course Notes 1997.
Baraff, "An Introduction to Physically Based Modeling—Rigid Body Simulation II—Nonpenetration Constraints", pp. D1-D31, Online SIGGRAPH Course Notes 1997.
Baraff, "Physically Based Modeling: Principles and Practice Implicit Methods for Differential Equations", pp. E1-E4, Online SIGGRAPH Course Notes 1997.
Faloutsos et al., "Composeable Controllers For Physically-Based Character Animation", pp. 1-2, *Department of Computer Science*, University of Toronto (1999).
Grzeszczuk et al., "NeuroAnimator: Fast Neural Network Emulation and Control of Physics-Based Models", pp. 1-104, *Department of Computer Science*, University of Toronto (1998).
"Havok—Animation", Havok product description, p. 1, Printed from the internet at www.havok.com/content/view/18/31/html on Feb. 14, 2006.

(Continued)

*Primary Examiner*—Ulka Chauhan
*Assistant Examiner*—Jason M Repko
(74) *Attorney, Agent, or Firm*—Townsend and Townsend and Crew, LLP

(57) ABSTRACT

Embodiments of the present invention provide methods and apparatus wherein physics models are integrated with motion capture animation to allow for variability in animations, dynamic response, such as animating events different from those for which motion capture data was obtained, including changes in character purpose and collisions. The physical model may include sets of internal forces and/or external forces. To facilitate the integration of mo-cap animation data with physics models, mo-cap animation data is played back using forces on physical models rather than directly setting joint angles or positions in a graphical skeleton, which allows the animation to be dynamically altered in real-time in a physically realistic manner by external forces and impulses.

3 Claims, 4 Drawing Sheets

OTHER PUBLICATIONS

"Havok—Complete", Havok product description, p. 1, Printed from the internet at www.havok.com/content/view/17/30/html on Feb. 14, 2006.

"Havok—Physics", Havok product description, p. 1, Printed from the internet at www.havok.com/content/view/17/30/html on Feb. 14, 2006.

"Havok—FX", Havok product description, pp. 1-3, Printed from the internet at www.havok.com/content/view/187/77/html on Feb. 14, 2006.

Hodgins et al., "Animating Human Athletics", International Conference on Computer Graphics and Interactive Proceedings of the 22nd Annual Conference on Computer Graphics and Interactive techniques, pp. 71-78, SIGGRAPH '95 ACM Press, New York, NY, (1995).

Kokkevis, E., "Practical Physics for Articulated Characters", pp. 1-16, Sony Computer Entertainment America, Game Developers Conference (2004).

Kovar, et al. "Motion graphs", pp. 473-482, Proceedings of the 29th Annual Conference on Computer Graphics and Interactive Techniques, San Antonio, Jul. 23-26, 2002.

Liu et al., "Synthesis of Complex Dynamic Character Motion from Simple Animations", pp. 408-416, Proceedings of ACM SIGGRAPH, San Antonio, Jul. 23-26, 2002.

"Natural Motion Dynamic Motion Synthesis" Natural Motion product description, pp. 1-3, Printed from the internet at www.naturalmotion.com/pages/products/html on Feb. 14, 2006.

O'Brien et al., "Dynamic Simulation of Human Diving and Splashing Fluids", pp. 1-4, Printed from the internet at http://www.cs.berkeley.edu/~job/Papers/obrien-1994-DSH.pdf on Feb. 6, 2006.

Savenko et al., "A Biomechanics-Based Model for the Animation of Human Locomotion", pp. 1-11, *Department of Computer and Information Sciences*, De Montfort University Milton Keynes, UK. (1999).

Witkin et al., "Motion Warping", Proceedings of ACM SIGGRAPH 95, Annual Conference Series, pp. 105-108. ACM SIGGRAPH, Aug. 1995.

Witkin, "Physically Based Modeling: Principles and Practice—Constrained Dynamics", pp. F1-F12, Online SIGGRAPH Course Notes 1997.

Witkin et al., "Physically Based Modeling: Principles and Practice—Differential Equation Basics", pp. B1-B8, Online SIGGRAPH Course Notes 1997.

Witkin, "Physically Based Modeling: Principles and Practice—Differential Equation Basics", pp. C1-C12, Online SIGGRAPH Course Notes 1997.

Wooten et al., "Animation of Human Diving" pp. 1-6, Printed from the internet at http://www.cc.gatech.edu/gvu/animation/papers/cgf96.pdf on Feb. 6, 2006.

Zordan et al., "Tracking and Modifying Upper-body Human Motion Data with Dynamic Simulation", pp. 13-22, Computer Animation and Simulation '99, Eurographics Animation Workshop, N. Magnenat-Thalmann and D. Thalmann, eds., Springer-Verlag, Wien (Sep. 1999).

* cited by examiner

COMPUTER ANIMATION OF SIMULATED CHARACTERS USING COMBINATIONS OF MOTION-CAPTURE DATA AND EXTERNAL FORCE MODELLING OR OTHER PHYSICS MODELS

CROSS-REFERENCE TO RELATED APPLICATIONS

This application is a continuation application of U.S. patent application Ser. No. 11/180,978 filed Jul. 12, 2005 (now abandoned) entitled COMPUTER ANIMATION OF SIMULATED CHARACTERS USING COMBINATIONS OF MOTION-CAPTURE DATA AND EXTERNAL FORCE MODELLING OR OTHER PHYSICS MODELS, which is hereby incorporated by reference, as if set forth in full in this document, for all purposes.

BACKGROUND OF THE INVENTION

The present invention relates generally to the field of character animation, and more particularly to a method of and system for animating a character using a combination of motion capture and virtual model or "rag-doll" physics.

Many video games, including sports titles, use motion capture (mo-cap) data as the source of animation for character models. In most video games, a game engine runs according to the rules of the game taking into account user input and presenting an animated display that is responsive to the user input. For example, if the user presses a button that is a "jump" button according to the game rules, then the game engine would animate a character such that it appears to jump.

The display of a video game is generally a video sequence presented to a display capable of displaying the video sequence. The video sequence typically comprises a plurality of frames. By showing frames in succession in sequence order, simulated objects appear to move. The game engine typically generates frames in real-time response to user input, so rendering time is often constrained.

As used herein, "frame" refers to an image of the video sequence. In some systems, such as interleaved displays, the frame might comprise multiple fields or more complex constructs, but generally a frame should be thought of as a view into a computer-generated scene at a particular time or short time window. For example, with 60 frame-per-second video, if one frame represents the scene at t=0, then the next frame would represent the scene at t=1/60 second. In some cases, a frame might represent the scene from t=0 to t=1/60, but in the simple case, the frame is a snapshot in time.

A "scene" comprises those simulated objects that are positioned in a world coordinate space within a view pyramid, view rectangular prism or other shaped view space. In a common approach, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. It should be noted that if a game engine (or more specifically, a rendering engine that is part of the game engine or used by it) has data as to where each object or portion of a flexible object is in a scene, the frame for that scene can be rendered using standard rendering techniques so the more relevant aspect of a game is how to determine where each object is in the scene so that the rendered video sequence is appropriate.

A scene may comprise several objects with some of the objects being animate in that the objects appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animate and natural-appearing. Animate objects are typically referred to herein generically as characters and in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots or other character types.

Animation is the process of generating successive scenes such that when the corresponding frames are displayed in sequence, characters or other objects in the scene appear to move. Where the character represents a life form, it preferably moves in a natural-looking manner.

Generally, movement (or more precisely, the animation of simulated movement) can be inanimate movement or animate movement. In many cases, inanimate movement, such as the movement of a net in response to receiving a basketball, can be simulated using a physics engine that determines movement based on interactions between simulated objects. Animate movement is more complicated, as users and viewers of the video game animation expect natural movement and with some characters, especially simulated human beings, it is difficult to convey natural movement in real-time response to user input.

One well-known approach to conveying natural movement is to use motion capture (mo-cap) data. In a typical process, actual physical characters, such as sports players, have sensors attached to their bodies and proceed through various motions and a computer captures movement of the sensors. For example, a professional football player may perform a run, catch, kick or other move while wearing sensors and that motion is captured (recorded). A simulated character can then be easily animated to move naturally by having the body parts of the simulated character follow the motion recorded from the motions of the actual physical character.

Mo-cap has its limitations as it only allows for movements that were prerecorded or small variations thereof. Mo-cap provides extremely natural and believable motion but it is not very dynamic in that it is replayed exactly as recorded or slightly modified through warping, blending, or combined with inverse kinematics (IK). As a result, some games are forced to prevent or ignore dynamic situations that may occur in real life. Examples in a football video game include dynamic player-player collisions, dynamic player-player pile-ups, dynamic tackles and the like. Situations like these are often avoided or handled incorrectly at times resulting in unrealistic animation and game-play.

A character is often modeled as a skeleton comprising a plurality of body parts with joint constraints. Joint constraints might include attachment points (some of which might be pivot-able as described elsewhere herein), range of motion, degrees of freedom, masses, and possibly strength limits and distribution of masses. For example, a football player might be modeled with a torso, upper arms, forearms, head, waist, legs, fingers, etc., with the upper arm constrained to remain joined to the forearm at the elbow with less than 180 degrees of joint movement at the elbow. A skeleton can thus be represented in game data structures as a collection of body part data structures and a collection of joint constraints. A skeleton in motion might further include as part of its state the positions/orientations of skeleton parts, velocity/angular moment and a set of force/torque vectors on some or all body parts. A skeleton data structure might include data to hierarchically link body parts, such as pointers to parent and child body parts.

Motion capture data can be stored as a description of where each body part is at a given frame time, but motion capture data is commonly stored as descriptions of joint angles between joined body parts. The skeleton is often stored as a hierarchical structure, with some body part being the "root" part and each of the other body parts being connected directly or indirectly to that root part. Each body part might also have an associated mass and mass distribution with that information stored as part of the skeleton data structure. A position of the body parts is often referred to as a "pose". Thus, in a given frame, a character has a particular pose. With mo-cap data, the pose might be one specified by the mo-cap data.

Other approaches to animation have been tried. One such approach is rag-doll physics. In this approach, a character is modeled by a skeleton with joint constraints and the body parts move according to physics rules. A physics engine might operate on skeletons to indicate movement based on the laws of physics. For example, the input to a physics engine might include data structures representing one or more character skeletons, a current position of each of the body parts of the skeletons, a current velocity of each of the body parts, and a set of external force vectors and from those inputs, the physics engine would output a new position of each of the body parts of the input skeletons. The external forces might include gravity, resistance, and the impact forces from other characters or other objects in the scene. This is referred to as rag-doll physics because in the absence of forces, the character acts as a limp body and floats in space (or in the presence of a gravity force, just flops to the ground like a rag-doll).

Examples of physics engines include those provided by Havok and Touchdown Entertainment. Using this approach, unscripted physics-based animation can interact correctly with a dynamic environment. Unfortunately, rag-doll physics does not solve the age old problem of generating natural appearing human motion. By itself, it only works well on dead or unconscious characters or in cases where the external forces are so large that they overpower muscular forces.

Some approaches to combining motion-capture controlled animation with rag-doll physics have been tried, but tend to lose realism in the process. For example, some physics engines might use "powered joint constraints" wherein joints are simulated with motors attached to the joints that attempt to move the limbs attached at the joint to a target orientation. This is difficult to match exactly and much of the fidelity of the mo-cap movement is lost.

BRIEF SUMMARY OF THE INVENTION

Using methods and apparatus described herein, physics models can be integrated with motion capture animation to allow for variability in animations, dynamic response, such as animating events different from those for which motion capture data was obtained, including changes in character purpose and collisions. The physical model might include sets of internal forces (simulating muscles, etc.) and/or external forces (simulating collisions, friction, gravity, air/water resistance, etc.).

In some embodiments, the physics model is added into a system that does not ordinarily deal with physics models. For example, the "pose" or position of the various body parts of a character at a given frame time (possibly also taking into account velocity and acceleration) might be extracted from an animation system within a game or simulator, modified appropriately and then fed back into the preconfigured game/simulation system for further animation processing. In this manner, the operation of a game/simulator can be modified without requiring a rewrite of systems such as a texturing system, background object generation system, rendering system, etc.

Using these methods, rag-doll physics can be used to generate dynamic collision responses in mo-cap based animation of a human or other character. For example, mo-cap based characters can dynamically fall on other characters as a result of dynamic collisions that were not captured as part of the mo-cap data, as well as get up from random falls while maintaining natural looking motion. Extensions might cover techniques to help animate dynamic tackles and player piles.

Motion capture animation data is played back using forces on physical models instead of the usual method of directly setting joint angles or positions in a graphical skeleton. This allows the animation to be dynamically altered in real-time in a physically realistic manner by external forces and impulses. The technique of using external forces and torques to move each body part independently in the physical model, during locomotion modes, allows very accurate motion control at large time steps (such as once per frame) without solving difficult multi-body inverse dynamics problems. This greatly reduces the cost and complexity of the simulation, while increasing the accuracy of the motion control. Using these techniques, other animation processes become feasible or at least simplified.

In other aspects of an animation system, ballistic falls, protective falling motion, and getting up are modeled such that movement looks natural. For example, ballistic falls can be animated using a conventional PD controller that seeks to move body parts towards a target pose. Ballistic falls are improved upon by using the existing angular velocities and rotational inertias of the body parts as additional terms of the proportional gain equation that drives the PD controller, rather than just an error in the PD controller's P term.

In some cases, to make animation look natural when a character has been dynamically moved off of its mo-cap path (i.e., the movement over time of various body parts as dictated by the mo-cap data), a multi-frame transition back to the mo-cap path might be tried, with "intermediate target poses" used to preserve the correct relative angles of children body parts that are attached to parent body parts that are in arbitrary orientations due to previous deviations.

To speed up physics processing, a simplified, invisible skeleton (a "physical model") comprising rigid body "bones" connected by constrained joints (i.e., a rag-doll) is used, but, being simplified and not rendered, makes for quick processing.

The simplified skeleton has fewer body parts than the skeleton used for rendering a scene, and dynamic operations that move the body parts of the invisible skeleton are translated to the visible "graphical" skeleton by "attaching" corresponding body parts together with "springs" such that the corresponding bone it reinforces are considered by the physics engine such that movements in the invisible skeleton cause movements in the graphical skeleton. In some embodiments, to further simplify the invisible skeleton to have fewer joints and/or body parts, some joints have pivot constraints. With a pivot constraint, a body part does not have to remain attached to another body part at the same connection point, but can slide along a track associated with the other body part.

The position of the connection point might be determined from the relative positions of graphical skeleton body parts, spring forces or other suitable inputs. For example, adjusting the location of the pivot points of where the arms and head attach to the torso (in the physical model) allows the physical model to have fewer joints than the graphical model, while still keeping full accuracy during the mapping between the graphical skeleton and the physical body parts. The location of such pivot points might be updated each frame.

When animating a character falling, a falling sequence is typically played back. However, when an unscripted fall occurs, this does not look natural, nor does simply letting the character's parts fall according to physics rules, because a falling person normally generates "protective falling motion". To handle this, the game engine might rely on a rule based expert system that blends between reference poses based on the dynamic situation.

When animating a "get-up", where a character is rising from an arbitrary position, a combination of internal and external forces is used for improved animation. An external force is applied to the pelvis, for example, to help lift and orient the player during the getup, while internal forces are used to pose the model during the getup.

When handling complex deviations, an animation process of the game might run motion supervisors that monitor events to determine if a mode shift is in order. For example, a "fall" motion supervisor might monitor center of gravity positions and determine that a character transitioned from a mo-cap locomotion mode to a falling mode, in which case animation should use dynamic fall processes to animate rather than mo-cap processes.

Other objects, features, and advantages of the present invention will become apparent upon consideration of the following detailed description and the accompanying drawings, in which like reference designations represent like features throughout the figures.

DETAILED DESCRIPTION OF THE INVENTION

Overview of Game Computing System

An improved character movement system for use in game animation in an interactive computer game is provided herein. In one aspect, character movement is performed according to motion-capture (mo-cap) data at times, according to unscripted dynamic movements at other times, and possibly a combination of the two at other times. A character can be represented by a set of body parts and joints connecting the body parts. Dynamic movements can be implemented with movement described by a set of internal forces (possibly changing over time) that are applied to the joints (simulating muscles, etc.) and/or by a set of external forces (simulating the application of external forces applied to body parts). The use of a set of external forces (by themselves or with other considerations) is often referred to as "rag-doll physics" because a character animated according to a set of external forces appears as a floppy rag-doll pushed by those forces.

In character movement systems described herein, rag-doll physics is combined with mo-cap based animation to generate dynamic collision responses by converting mo-cap data to a set of external forces. When mapped as external forces, other operations are also simplified, such as allowing mo-cap based characters to fall on other characters as a result of dynamic collisions, allowing mo-cap based characters to get up from random falls while maintaining natural looking motion, animating dynamic tackles and player piles and the like.

Figure 1:
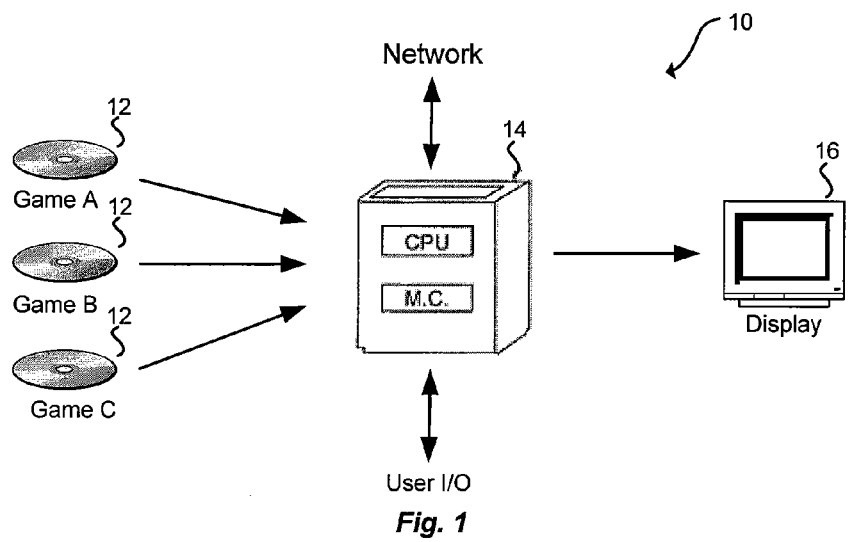
FIG. 1 illustrates a game system for providing one or more games for a user according to embodiments of the present invention.

FIG. 1 illustrates game system 10 for providing one or more games for a user according to embodiments of the present invention. System 10 is shown including one or more game media 12 (game A, game B, game C), a game device 14, and a display 16.

One or more game media 12 can include any game applications that may be used by game device 14 to involve a user in a game. Each game medium 12 includes logic to provide a game, denoted as game A, game B, and game C. In one embodiment, the game provided by game device 14 is an electronic video game. Games are each individually stored on media, such as compact disk read-only memories (CDROMs), digital versatile disks (DVDs), game cartridges, or other storage media. A game, such as game A, is inserted in, coupled to, or in communication with game device 14 so that game device 14 may read all or part of a game application and/or related game data found on game media 12. Some games might also be included integrated in with game device 14.

Game device 14 is a computing device that includes a processor, such as a CPU, and data storage combined or in separate elements. Game device 14 may be connected to a network that allows game device 14 to provide games that are not included on one or more game media 12. Thus, game A, game B, and game C may be accessed through the network and not be individually stored on game media 12. To allow a user to select from a plurality of available games, a display 16 might present a list of the games provided by game applications on game media 12.

A game application may be also referred to as a game code and/or a game program. A game application should be understood to include software code that game device 14 uses to provide a game for a user to play. A game application might comprise software code that informs game device 14 of processor instructions to execute, but might also include data used in the playing of the game, such as data relating to constants, images and other data structures created by the game developer including prerecorded mo-cap data. A user interacts with the game application and game device 14 through user input/output (I/O) devices.

Figure 2:
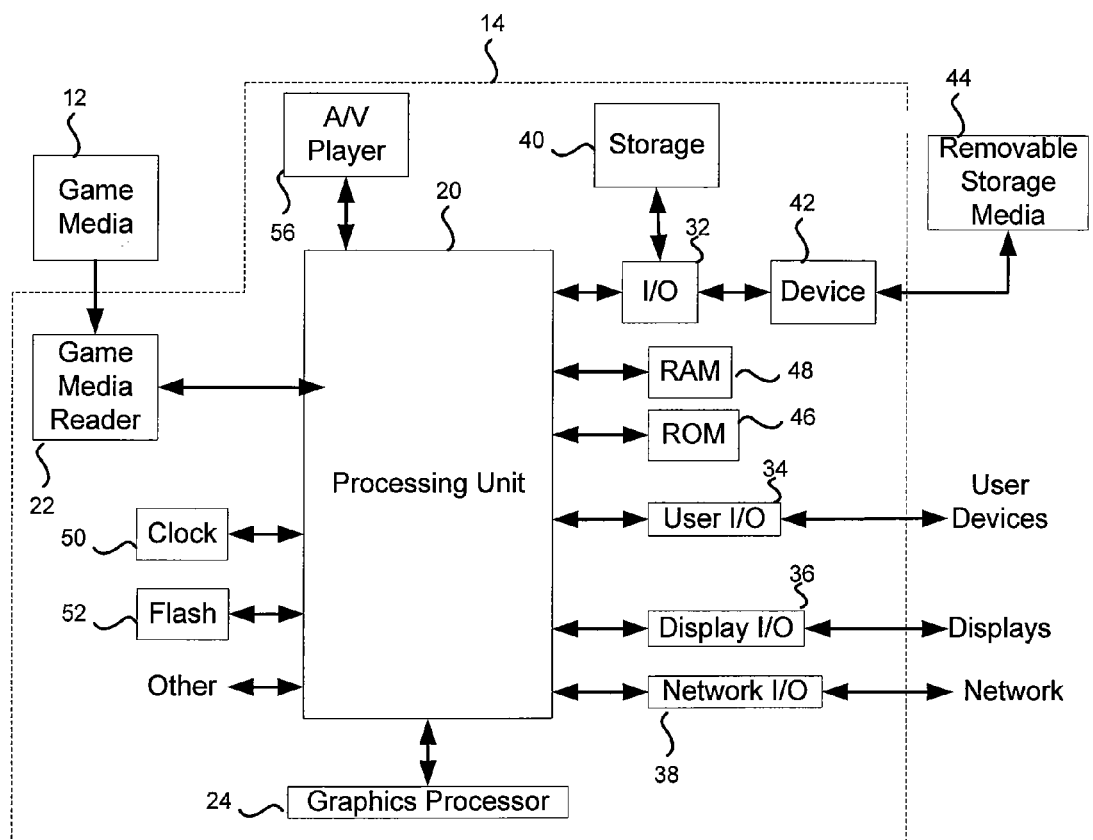
FIG. 2 illustrates an embodiment of a game device according to the present invention that forms part of the game system shown in FIG. 1.

FIG. 2 illustrates an embodiment of game device 14 according to the present invention. It should be understood that other variations of game device 14 may be substituted for the examples explicitly presented herein and may be appreciated by a person of skill in the art. As shown, game device 14 includes a processing unit 20 that interacts with other components of game device 14 and also external components to game device 14. A game media reader 22 is included that communicates with game media 12. Game media reader 22 may be a CDROM or DVD unit that reads a CDROM, DVD, or any other reader that can receive and read data from game media 12.

Game device 14 might include a separate graphics processor 24. Game device 14 might be a handheld video game device, a console (special purpose) computing system for operating computer games such as video games, a general-purpose laptop or desktop computer, or other suitable system.

Game device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for game device 14. Processing unit 20 communicates through I/O 32 to store data, such as game state data and any shared data files. In addition to storage 40 and removable storage media 26, game device 14 is also shown including ROM (read-only memory) 46 and RAM (random access memory) 48. RAM 48 may be used for data that is accessed frequently, such as when a game is being played.

User I/O 34 is used to send and receive commands between processing unit 20 and user devices, such as game controllers. Display I/O 36 provides input/output functions that are used to display images from the game being played. Network I/O 38 is used for input/output functions for a network. Network I/O 38 may be used if a game is being played on-line or being accessed on-line.

Game device 14 also includes other features that may be used with a game, such as a clock 50, flash memory 52, and other components. An audio/video player 56 might also be used to play a video sequence such as a movie. It should be understood that other components may be provided in game device 14 and that a person skilled in the art will appreciate other variations of game device 14.

Program code might be stored in ROM 46, RAM 48 or storage 40 (which might comprise hard disk, other magnetic storage, optical storage, other storage or a combination or variation of these. In a common arrangement, part of the program code is stored in ROM that is programmable (ROM, PROM, EPROM, EEPROM, etc.) and part of the program code is stored on removable media such as game media 12 (which can be a CD-ROM, cartridge, memory chip or the like, or obtained over a network or other electronic channel as needed). In general, program code can be found embodied in a tangible signal-bearing medium.

RAM 48 (and possibly other storage) is usable to store variables and other game and processor data as needed. Typically, RAM is used and holds data that is generated during the play of the game and portions thereof might also be reserved for frame buffers, game state and/or other data needed or usable for interpreting user input and generating game displays.

As game device 14 reads game media 12 and provides a game, information may be read from game media 12 and stored in a memory device, such as RAM 48. Additionally, data from storage 40, ROM 46, servers through a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Character Movement System

Figure 3:
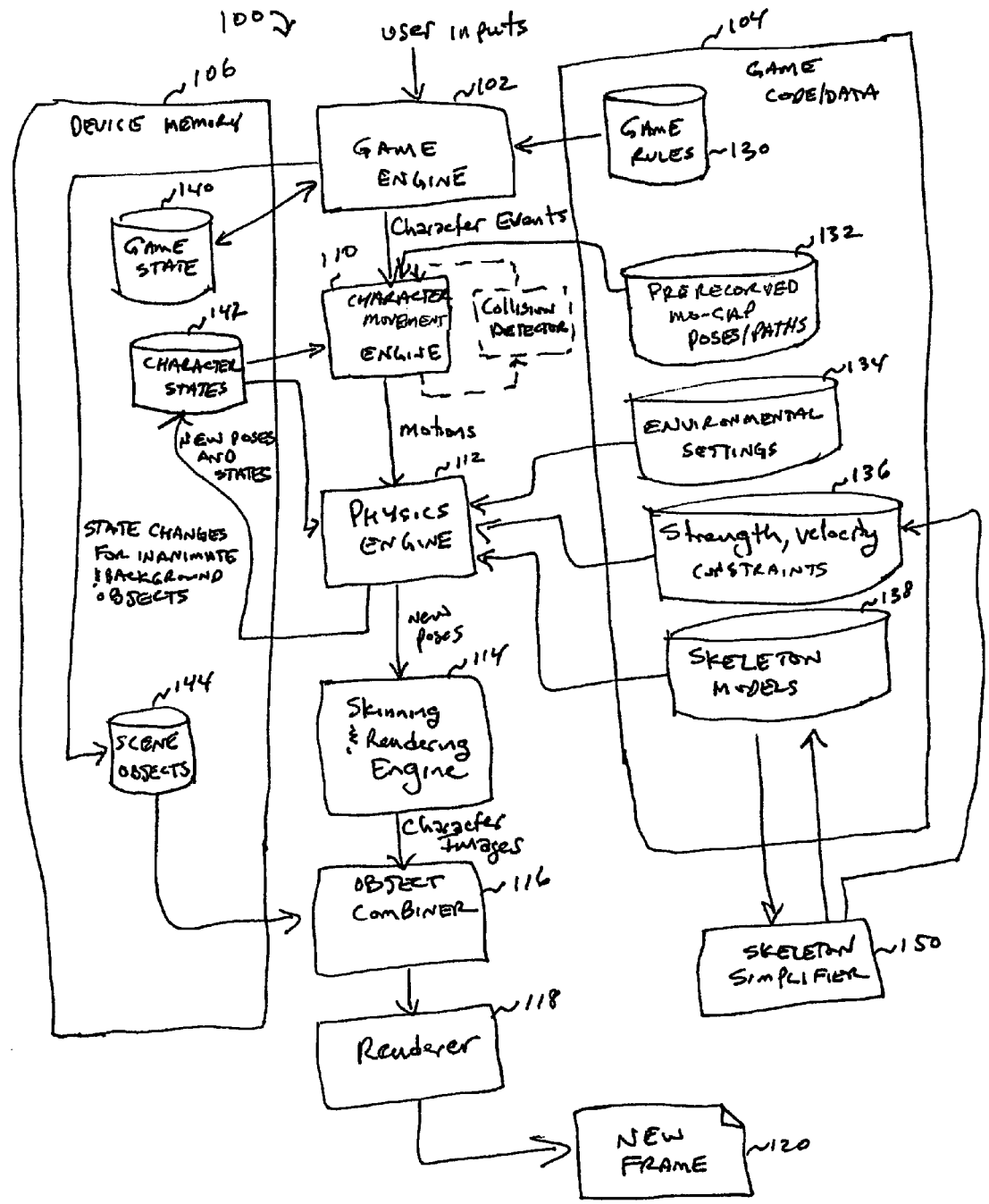
FIG. 3 illustrates an example of game data that might form part of a game state.

Game device 14 provides for user input to control aspects of the game according to game rules. Game rules might be specified in instruction form on game media 12. Examples of game rules include rules for scoring, possible inputs, actions/events, movement in response to inputs, default mo-cap movements and the like. FIG. 3 illustrates some elements of game system 10 in more detail, especially those involved in character movement processing. Other components control what inputs are accepted and how the game progresses, but the focus here is on the elements used for generating suitable animation based on various inputs.

As shown in FIG. 3 by system 100, user inputs and game code/data are used to generate display video. The game system also handles playing the game and presenting corresponding audio output, but this explanation is primarily focused on generating frames of display video for the game. A game engine 102 receives the user inputs and determines character events, such as tackles, collisions, runs, throws, and dog piles or other events appropriate for the game.

Those character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded mo-cap poses/paths 132, environmental settings 134, strength and velocity constraints 136, and skeleton models 138. The device executing the game might have memory 106 for game state 140, character states 142 and scene object storage 144. Character states 142 comprise storage for a current pose of characters being animated.

In operation, game engine 102 reads in game rules 130 and considers game state 140 to arrive at character events. Character movement engine 110 reads in prerecorded poses/paths 132 as well as character states 142 and with an optional collision detector process derives the desired motions for characters. Motions might be expressed as a set of external forces, target poses and the like. As needed, character movement engine 110 may also use other data elements shown, such as skeleton models 138. Character movement engine 110 might also introduce character movements for randomness, personality, etc.

Physics engine 112 has as its inputs the skeleton models of various characters, character states such as current poses (i.e., positions of body parts expressed as positions, joint angles or other specifications), and velocities (linear and/or angular) of body parts and motions provided by character movement engine 110, which can be in the form of a set of force/torque vectors for some or all body parts. From this information, physics engine 112 generates new poses for the characters using rules of physics and those new poses can be used to update character states 142 and are also provided to engine 114. Where invisible skeleton models are used, character states 142 might contain current position of visible "graphics" characters as well as the invisible rag-doll skeleton characters.

Rag-doll physics requires advanced collision and constraint solving algorithms, and these require very sophisticated and highly optimized numerical software to solve the large linear systems in near linear time. If such requirements are met by an existing physics engine, it can be plugged into the game loop to deal with those tasks.

Engine 114 takes into account the surfaces, colors and textures of the body parts of posed characters and renders character images. Object combiner 116 can then combine those character images with inanimate and background objects obtained from scene objects store 114 to provide a complete scene to renderer 118.

A skeleton simplifier 150, being part of the game or part of a game development system, can generate simplified skeletons from complex skeletons given various constraints. For example, a graphical skeleton representing a character that is actually seen in a scene might comprise over 100 joints, such as one model that has 104 elements. A simplified skeleton that is operated on by character movement engine 110 and physics engine 112 might have 10-12 joints, resulting in considerable savings of processing power. Thus, character movement engine 110 would calculate forces and torques, then pass the simplified skeleton data on to physics engine 112. Since the joint constraints typically are solved simultaneously in the physics steps, having an order of magnitude fewer constraints is much easier to operate on and can be done in real-time. More than 104 elements might be present for the graphical skeleton and fewer than 104 elements might be present. More than 12 or less than 10 joints might be present in the simplified skeleton.

Although not shown in the figure, physics engine 112 might pass the data back after transforming it, so that the character movement engine 110 could move the graphical skeleton according to the movements of the simplified skeleton, such as through the use of "spring" forces. In that arrangement, character movement engine 110 might include a converter for creating a simplified skeleton from a 100+ joint graphical skeleton for output to physics engine 112 and a converter for performing the inverse, i.e., converting from the moved simplified skeleton to the complex graphical skeleton.

For placement within an existing game structure, hooks might be provided from an existing game system to export events to a character movement engine, which feeds to a physics engine and the output of the physics engine can be fed back into the existing game system (with positions of character body parts moved) to have the existing game system handle all of the details of rendering and looping through the game loop. Thus, the existing game system determines a current game state (which in turn can be used to render a current frame) from inputs for a game and a game state for a previous frame (typically the immediately prior frame, but this might not always be true if animation is done less frequently than once per frame or uses more than just the prior frame for determining the current frame). Once the game system determines its inputs, then it might run some external processes to determine new positions of characters and other objects, prior to a step of rendering the character and the other objects in a scene and then loop back to work on the next frame (the "game loop"). A character movement engine might be one of those external processes interposed in the game loop for handling rag-doll and other operations, such as modification of a character body part path between a determination of a desired position and a rendering, so that additional physics steps (such as collisions, piling, etc.) can be introduced into the motion of the characters.

This can be implemented as a callback, wherein the physics engine is provided with an entry point into character movement engine code such that the physics engine, upon detecting a collision, makes a call to that entry point, thereby informing the character movement engine of a collision and possibly also information about the collision, including which character owns the rigid body, and which body part the rigid-body represents.

Figure 4:
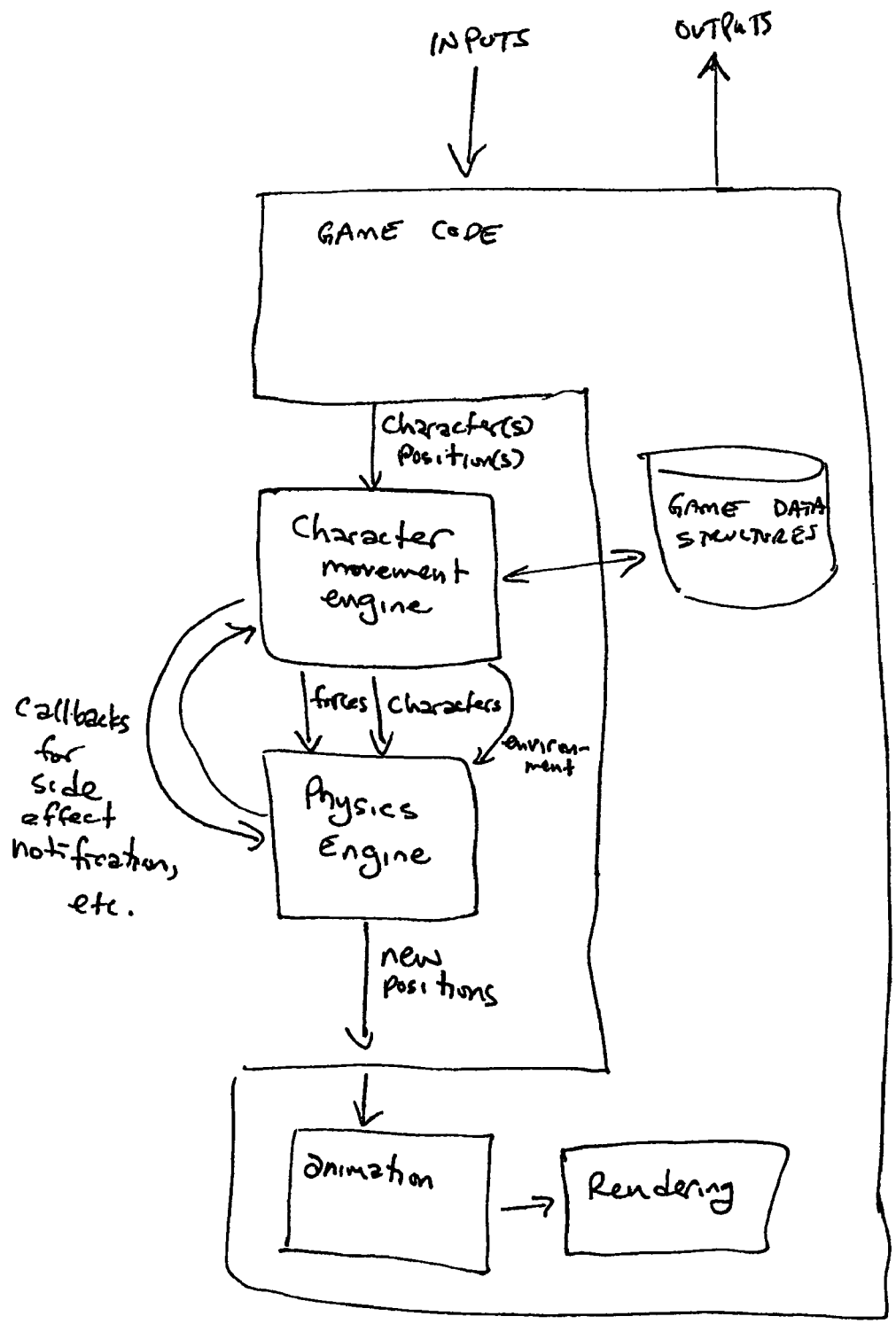
FIG. 4 is a block diagram of a game system architecture wherein a character movement engine is added to an existing game engine.

FIG. 4 illustrates an example of a game system wherein the character movement engine and physics engine are implemented as separate structures, relying on processing by a game system that might or might not know about the character movement engine and physics engine. Where the game system stores character poses in one form and the physics engine operates on them in another form, a conversion might be needed at the output of the physics engine. For example, if the physics engine outputs its poses (positions of the processed character's body parts) in the form of positions of the body parts but the game system operates on poses described by joint angles, a conversion from positions to corresponding joint angles is done.

With a system and structure now described for character motion handling, operations using those elements will now be described.

Rag-Doll Operations

There are several approaches to using motion capture data for animation. Motion capture data might be in the form of position data, where the motion capture data specifies the position of each body part from frame to frame, in a body reference space. Animation would then involve mapping from the body reference space, through translation rotation, scaling, etc. to a world space and then rendering. The position data can be transformed into velocity data. Either way, there are problems. Using positions does not deal properly with interpenetrations so it does not always look right. Using velocities does not work correctly with resting contact problems and constraints. Transforming motion capture data to a set of forces on body parts avoids these issues.

In a basic operation, a pose is stored as a set of joint angles and transformed into a set of external forces/torques that would result in that set of joint angles, at least approximately. The position of any body part in a character, relative to a root body part, can be determined from the character's skeleton model and the set of joint angles. The location of all of the body parts in the world coordinate space can then be determined from the positions and the position of the root body part in the world coordinate space. In the case where an existing game system operates on joint angles or positions, the data from the existing game system is assumed in that format and when character state is fed back into the existing game system, the state is provided in the form expected for the existing game system.

For example, the existing game system might be used for building a physical model of a sports player, then the character movement engine poses the physical model using motion-capture data, builds a combined set of forces (mo-cap forces and other forces) and the physics engine executes the movement using those forces, and maps the resulting physical model's pose back onto a character for rendering.

Mo-cap data is combined with external forces by receiving motion capture data for a character in the form of positions and/or joint angles, wherein the motion capture data represents motion performed by a physical character to which the character is to correspond and the motion capture data is stored at least in part as a set of joint angle movements describing changes of joint angles over time or positions. From the stored motion capture data, a set of motion-capture external force vectors can be calculated (often in advance) such that application of the set of motion-capture external force vectors to the plurality of articulated body parts forming a character would cause motion at least approximating motion described by the motion capture data. In that form, a set of unrecorded external force vectors representing other forces (dynamic collision forces, etc,) can be easily combined with at least a part of the set of motion-capture external force vectors to simulate events other than those for which motion capture data was obtained.

The combined set of force vectors can be provided to a physics engine to animate the character appropriately. If the physics engine outputs a new pose in the form of body part positions, a process can convert those positions to a set of joint angles and provide that set of joint angles to the portion of the game loop that handles the rendering of characters.

As needed, velocity, momenta, etc. of body parts can be worked out from the mo-cap data.

Every rag-doll body part, although connected by constraints, is treated as its own separate entity. A destination position and orientation is computed for the character (or more typically, obtained from a prior process that takes into account game inputs and other considerations to determine where the character's body parts should be next (not taking into account all of the influences—those are the influences handled by the character movement engine). The character movement engine computes the forces and torques required to move each body part from its previous frame rag-doll position/orientation to its desired current frame position/orientation in a single tick. A "tick" is the time between successive frames; it should be understood that other timeframes can be used as well, such as skipping frames (longer tick times) or performing calculations for sub-frames (shorter tick times).

The character movement engine can then feed in those computed forces and torques into a physics engine that calculates movements of elements in a scene based on the input forces and torques. If the forces and torques that are input into the physics engine are just the forces and torques determined by the character movement engine as being necessary to maintain the destination positions and orientations that were fed into the character movement engine, the physics engine will move the body parts to the destination positions and orientations. While this does not require a character movement engine to be interposed between a game animation system and a physics engine, one significant benefit of interposing a character movement engine in such a manner is that the destination position and orientation can be modified to account for other influences, such as collisions. Such other influences can be easily taken into account by expressing those influences as external forces and/or torques. Since the character movement engine has animation information in the form of forces and torques, the additional influences can be brought into the system by simply adding the forces and/or torques representing the additional influences to the forces and/or torques representing the destination position and orientation provided to the character movement engine. In a typical system, the destination position and orientation of a plurality of body parts is derived from motion capture ("mo-cap") data.

Simplified Skeletons

In some cases, the skeleton might be simplified without perceptible degradation of the animation. With a simplified skeleton, less computing is required and that translates into more time or computing power available for other tasks or performs the same level of animation with less powerful hardware.

In one approach, a skeleton is simplified by "fixing" certain joints. For example, inner torso bones might be approximated by a rigid torso, in which case all of the torso joints can be ignored. In another approach, one that seems to perform very well for the amount of computation it saves, is to replace two or more joints with one pivoting joint, i.e., a joint where the point of joining two body parts is movable.

An example simplified skeleton (i.e., a rag-doll model) might comprise rigid bodies and constraints. Rigid bodies represent the body parts, and constraints represent the joints. In a specific example, there are 11 body parts: a pelvis, a torso, a head, two upper arms, two forearms, two thighs, and two shins. The hands and feet can be ignored in the processing—perhaps they remain animated by mo-cap data and don't change paths (relative to the wrists at least) as a result of collisions.

Constraints represent the joints that hold the body parts together. There are 10 constraints in the 11—body part model, comprising four hinge constraints (i.e., joints with one angular degree of freedom, or "1 DOF") for the elbows and knees and six "rag-doll" constraints (three angular DOFs) for the two shoulders, two hip-to-leg joints, neck, and waist. Other types of joints might be used.

Collisions

Animating collisions might involve acquiring new mo-cap or hand key-framed animations to cover a few identified cases, creating a rule based system to select between and control the phases of dynamic falls, and/or incorporating physics steps to allow dynamic collision responses during the falls.

When dynamic collisions, falls, etc. occur, such that a character deviates from a mo-cap path, the character movement engine might track that deviation and work the character back to the mo-cap path. Following a collision, the engine could just place the character back on track, but animating that most often does not look natural as a character "teleports" or accelerates body parts with superhuman strength.

Multi-Use Rag-Dolls and Player Scale

It might be possible to modify an exported rag-doll at load time, and adjust its mass, collision representation shapes, and constraint positions to account for the scaling issues. However, that might prove difficult for content producers. An easier approach might be to build models on-the-fly for a given skeleton scaling so that particular skeletons can be reused, even across players (such as for player substitution, etc.). A rag-doll might be modified on the fly to new skeletal dimensions and transitioned onto a different player. Rag-dolls might have variable mass to account for the character's scale (some characters are bigger than others). In some embodiments, strength per character is tuned to handle the different masses.

Hierarchical Vs. Flat Matrices

In a player's skeleton, each joint's pose is described as an orientation relative to its parent's orientation. This is referred to as a hierarchical (nested) system. Physically linked models, such as rag-dolls and their body parts, all reside in a single flat reference frame, which allows things like conservation of momentum to be more easily exploited. It appears to be a useful optimization to iterate over the graphical skeleton and construct a flat version of its hierarchical pose once per tick for future reference during the remainder of the rag-doll processing. The flat version of a skeleton's joint angles as referred to as the skeleton's flat matrices.

Creating the Rigid Bodies

Every body part is a rigid body in the physics simulation. The mass, rotational inertia, and coefficients of friction and restitution are all obtained from a small data table indexed by body part. The collision shape generated for every body part is a cylinder with hemispherical end-caps (a capsule or "sausage"). The head is a sphere, a degenerate case of a sausage. The sausages work very well for the arms, legs, and head. More accurate representations for the torso and pelvis might be used, such as convex polygonal hulls.

When building the sausages, a radius and two skeletal joint indices are obtained from a small data table indexed by body part. The distance between the joints is measured directly from the corresponding graphical player skeleton's flat matrices, providing the length of the sausage. The center point between the two joints is used to form the initial position of the body part, and the initial orientation is set to correspond to the orientation of the flat (world frame) start joint for the part. The sausage is created in body space, in such a way that it will span from the start joint to the end joint when orientated by the start joint's flat orientation; its center point corresponds to the center-of-mass of the rigid body.

The following data is used to construct the rigid bodies, and is provided in a single table, indexed by body part, as character state: the index of the part's start joint in the graphical model's skeleton, the index of the part's end joint in the graphical model's skeleton, its mass, its rotational inertia and its radius.

Each constraint connects two rigid bodies together, and its pivot point is located exactly at a character's skeletal joint in world space. When building a constraint, the following information is provided in a table indexed by constraint part: the type of the constraint (hinge or rag-doll), the index of the corresponding skeletal joint, the index of first rigid body to be attached to the constraint (the parent), the index of second rigid body to be attached to the constraint (the child), and information describing the joint limits, depending on the type of the constraint.

Specifying joint limits for the elbows and knees can be done with a vector specifying the hinge axis and a permissible angular range (two angles, as radians).

Directly Posing the Physical Model

A target pose can be represented as an array of orientations, one orientation per skeletal joint. Each orientation comprises three (XYZ order) Euler angles. If the pose is in a hierarchical format, it can be converted to a set of flat matrices (described above). Each of these flat matrices then contains the orientation and position of the corresponding skeletal joint in the world reference frame.

To pose the rag-doll, a loop is performed over all of the rigid bodies. Each body part knows its start and end joint index in the flat matrices. The orientation of its start joint is looked up, converted to a quaternion and then used directly to specify the new orientation of that body part. When extracting a quaternion from a transformation matrix, ensure that any scaling factors in the matrices do not cause problems. Next, the positions of the start and end joints are then both obtained from the flat matrices, and are averaged together to form the new center point of the body part.

The linear and angular velocities of every body part are also initialized to zero during the initial pose. The rag-doll can be "posed" indirectly by creating a pose for its attached graphical skeleton. In other words, a character movement engine could generate joint angles for the graphical skeleton and pass the result to the rag-doll engine code as its target. Essentially, the manually generated pose appears as if it came from mo-cap data.

Running a Physics Step

To allow the rag-doll model to animate, the physics engine executes a cycle. When no forces other than gravity are applied to the model, it falls on the ground. To see the motion of the physical rag-doll in the game, the new pose resulting from each physics step is mapped back onto the graphical character prior to rendering. This involves updating the character's position, orientation, and joint angles. We refer to this process as feeding back to the character movement engine.

Position, Orientation, and Pose Variables

The following variables define a character's position, orientation and pose in a particular implementation:

Position—This is a 3D point, usually on the ground near the character's feet. It represents a player's single position, independent of the pose, and which moves in the exact 3D direction of the player's velocity. If game code manipulates this variable, it can easily position a player anywhere in the world.

FaceDir—A rotation about the world's up axis (Z-axis), used to roughly indicate which way the player is facing. This might be used by an AI subsystem and locomotion code. If game code manipulates this variable, it can easily spin a player to face any direction in the world.

RootRot—A second rotation about the world's up axis (Z-axis), used to allow the character's main joint to twist back and forth relative to the character's facing direction. For instance, when running in a straight line, the hips twist back and forth slightly, but the player's facing direction remains constant. This value usually comes from the mo-cap data.

RootTrans—A 3D offset from a player's position to the main joint of the skeleton. For instance, this allows the hips to move up and down and side to side when running, while permitting the player's position to move in a straight line. This value usually comes from the mo-cap data, and is in the character's un-scaled local reference frame (model space).

Skeletal Joint Angles—An array of approximately 104 elements, containing Euler angles specifying each joint's coordinate system relative to its parent's. These values usually come from the mo-cap data, although some may come from an IK system.

Feeding Back Skeletal Joint Angles

Each constraint in the physical model maps to a corresponding joint in the player skeleton to be updated. Since the joint angles in the player skeleton are in a hierarchical format, but the rag-doll's rigid body orientations are in a flat format, a conversion is done. The orientations of the two bodies connected by the constraint are read back from the physics engine in the world frame. Then the child body's orientation is computed relative to the parent body's orientation. This is accomplished by pre-multiplying the child's orientation quaternion by the inverse of the parent's orientation quaternion, and converting the resulting quaternion to a XYZ Euler angle format. Note that inverting any pure (normalized) orientation quaternion simply involves negating its first three components, which encode the axis of rotation, so the inversion process is efficient.

Blending Rag-Doll Physics and Motion Capture Animation

Blending allows motion capture animation to be modified for dynamic collisions that interfere moderately with the pre-recorded motion, such as a limb being pushed off-course as a result of a collision. Blending works well when the pre-recorded motion forms a reasonable target for the physical model to continue to follow, but may break down once the rag-doll gets "too far" away from the pre-recorded motion. A motion supervisor or other mechanism would be used to modify a mode to switch to a different animation.

One interesting development of the systems described herein is that results of the collision model (i.e., the rag-doll) are used when rendering the graphical model. Having the physical rag-doll model be the model to be rendered and not the mo-cap target model or some kind of blend between the two models, provides interesting dynamism, and prevents rag-dolls from interpenetrating with each other or the environment. The physical model is interesting because it responds correctly to collision impacts and resting contacts, and it will never be seen to interpenetrate any other model, even when unscripted collisions occur. Thus, the physics simulation provides both dynamic interactions as well as (and maybe more importantly) more plausible interactions.

As explained herein, a physics simulation done on a simplified skeleton can be used to drive a complex graphical skeleton for rendering.

Posing a Rag-Doll Using Only Forces

Two primary methods for posing a rag-doll using forces are (1) generate internal forces (modeling muscles/servos) that will move all of the joints to the target positions and (2) generate external forces (similar to wind or gravity) that will move and twist each body part to the correct position and orientation directly.

Internal forces would cause the feet to push against the ground and fight gravity and move the character to its target position.

The internal forces approach seems computationally prohibitively expensive and/or extremely difficult. There is a general lack of predictability when dealing with effects from friction, dynamically changing mass distributions of moving limbs, balance, and internal constraint forces, so computing the exact forces to obtain a pose would probably be done iteratively.

While internal forces might work, the influence of external forces (collision forces, etc.) can more easily be superimposed on a mo-cap path by converting the mo-cap path into a set of external forces.

Generating external forces to pose a rag-doll can easily be done as described herein. Each body part can be considered completely independently from the rest of the other body parts during posing, which greatly simplifies the physics. One approach is to loop over each part and compute the external force that will move its center-of-mass to the desired center-of-mass location and also compute the two forces to create an external torque that will rotate it to the desired orientation. These forces are then applied to their body parts and a physics time step is taken. The result is that all of the parts independently arrive at their target locations and orientations.

By having movement expressed as a set of external forces, other effects that are also expressed as a set of external forces can be brought into an animation by combination of the sets of external forces. For example, one set of external forces representing mo-cap movement can be combined with a set of external forces representing collisions with other characters. In another example, character movement can be blended between two mo-cap sequences so that a smooth transition can be shown between two or more mo-cap sequences. For example, a game might have pre-stored mo-cap data for a running character and mo-cap data for a jumping character.

For some transitions of a character from one mo-cap path to another, in order for the transition to look natural, the transition might take place over a number of frames where the time for transition might be determined by however long it takes the character to move from one path to the other while strength or other constraints are applied.

Execution Step

The processing required for rag-doll support continues to fit neatly together as a single step near the end of the game loop. It executes after everything has been updated and processed, but just before the final steps of collision detection and rendering. There are just a few steps involved, as follows.

The first step is to create a target pose for each rag-doll. The rag-doll is posed indirectly through the graphical skeleton, so what is actually needed is a pose for the graphical skeleton, which can be done by blending, mo-cap, etc. For the external forces mode, the target pose is stored as world space positions and orientations for each body part of the rag-doll. For internal forces mode, or freefall mode, the target pose is stored as a set of joint angles for the joints in the rag-doll.

This target pose usually captures the exact pose generated by a mo-cap animation system. One exception to this is when the rag-doll is generating its own motion, in which case some or all of the joints will be overwritten with generated data. Another exception is when the rag-doll is in external forces mode and obtaining the target pose would require too much strength, in which case a pose somewhere in between the current and target is computed and used as the target (termed an intermediate target pose).

The computation might be done by the character movement engine or might be the result of a physics step done by the physics engine where the physics engine is fed the strength constraints. A simple approach is for the character movement engine to examine the set of external forces/torques about to be fed to the physics engine and lower those forces/torques that exceed strength limits. Since the external forces were presumably calculated to get the character to the target pose, lowering them will not force the character far enough in one physics step, so it will achieve an intermediate pose. Unless otherwise indicated, where operations are described as dealing with a set of forces on body parts, it should be assumed that the set can also include one or more torques on body parts.

Once the target pose has been determined or an intermediate pose is determined prior to determining the set of forces/torques, the next step is for the physics engine to compute and apply forces and/or torques to the body parts that will cause the dolls to move toward their goals. When in external forces mode, a force and a torque is computed and applied to every body part. When in internal forces mode, or freefall, torques are computed and applied at the joints (once to the child, and equal and opposite to the parent).

Invisible skeletons can make the character movement steps easier. For example, an actual character that is rendered in animation might have more than one hundred body parts and joints. Rather than having the character movement engine deal with all of those parts, a simplified skeleton is used for character movement, such as the invisible skeleton described herein with fewer than a dozen joints. The animation of the invisible skeleton can drive the visible animation by informing the physics engine that body parts of the invisible skeleton are tied to selected body parts of the visible skeleton and the physics engine will move the visible skeleton body parts accordingly.

Some of the visible skeleton body parts might not be tied to invisible skeleton parts. For example, the hands and fingers of a character might remain unconstrained by the invisible skeleton and driven entirely by mo-cap data at full resolution. Thus, the physics engine does not even have to deal with those details.

After the forces and/or torques have been computed and applied to every body part of every rag-doll, the rag-doll physics executes a single time step, such as one $\frac{1}{60}^{th}$ of a second frame.

Method of Computing the External Force

One approach for computing the linear force to be applied at the center-of-mass of a body part is as follows:

$$vel' = (pos' - pos)/t$$

$$f = (vel' - vel) * m/t$$

Note that this assumes that the physics engine uses the following equations of motion:

$$vel' = vel + ((f/m) * t)$$

$$pos' = pos + (vel' * t)$$

Method Computing the External Torque

One approach for having the character movement engine calculate the torque to rotate a rigid body from one orientation to another is analogous to the method for the linear force. It starts by computing the exact angular velocity w (vector3) that will rotate a body from a starting orientation s (quaternion) to a destination orientation d (quaternion) in a single time step of duration t (seconds), given s, d, and t. Then, the torque to accelerate to that angular velocity is determined. IWorld and IWorldInv are variables representing the body's inertia tensor (in the world frame) and it's inverse, respectively.

$$z = ((d-s) * (2/t)) * quatInvert(s)$$

$$w' = vector3(z) * (1.0f/(1.0f + (z.w * t * 0.5f)))$$

$$torque = (IWorld * (w' - w))/t$$

Note that this assumes that the physics engine uses the following equations of motion:

$$L' = L + (torque * t)$$

$$w' = IWorldInv * L'$$

$$r' = quatNormalize(r + ((quat[w,0] * r) * (t/2)))$$

Where the physics engine uses other equations of motion, corresponding inverse operations could be used.

Internal Force Generation

In order to pose a rag-doll's body parts, without affecting its overall motion (such as if floating in space), the net external forces and net external torques should be zero. This means that when forces are applied, an equal and opposite force is applied as well, causing the net forces to cancel to zero. Linear momentum and angular momentum remain constant, while allowing the rag-doll to animate its pose.

Figure 5:
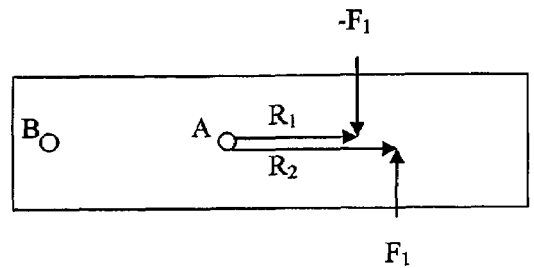
FIG. 5 illustrates force couples.

One way to do this is to simulate a three degree-of-freedom (3 DOF) servo motor at each joint. A servo rotates its connected bodies relative to each other by exerting equal and opposite torques on them, much like a cat in freefall rotates its body. Since the servo applies equal and opposite torques about a joint, no net external torque is created. A torque can be created through the application of two forces called a "force couple", which are equal and opposite and are applied along two different parallel "lines of action" on the rigid body, as illustrated in FIG. 5.

A force couple produces a net torque by summing its two resultant torques together. In the example shown in FIG. 5, the two torques are created about point A, with one being $(R_1 \times -F_1)$ and the other being $(R_2 \times F_1)$, in opposite directions. They sum together to form a single net torque $T_a = (R_1 \times -F_1) + (R_2 \times F_1)$. Since the two forces are equal and opposite, no net force is exerted, i.e., $F_{tot} = F_1 F_1 = 0$. However, because $R_2$ is longer than $R_1$, a net torque about point A is created. The opposite force couple is applied to the parent body part to generate the required equal and opposite torque to keep the forces (and torques) internal to the system.

A torque causes a rotation about the center-of-mass of a "free" rigid body. However, in some of these models for rigid bodies, the body parts pivot not at their center-of-mass, but they pivot at their joints. However, with proper simulation, the point of application of the force couple is irrelevant to the physics of the system and the same effect is produced whether centering the force couple at the center-of-mass or at the joint. One illustration of this is to note that the torque about some point A is $T_a = (R_1 \times -F_1) + (R_2 \times F_1)$, which can be rewritten as $T_a = (R_2 - R_1) \times F_1$ and since value $(R_2 - R_1)$ is the same for point A or some other point B, the pure torque produced by the force couple is the same about both points. In fact, the value $(R_2 - R_1) \times F_1$ about any point will be equivalent due to the way cross products work. This means that the force couple could be moved anywhere on the rigid body and produce the exact same net torque on the body. This can be used to simplify processing.

For example, one motion process might compute a desired torque to be exerted by a servo at a joint using a PD controller and then apply the torque to a child body part and the opposite torque to the parent body part joined to the child body part at the joint, without worrying about where the joints are actually located on each body.

The equal-and-opposite torques generated by the servos work their way up the hierarchy, and therefore need to be "accounted for" during future time steps in the parent joints. For instance, to hold the shoulder constant while bending the elbow requires the model to generate counter-torques at the shoulder joint. These in turn require counter torques to be generated at the waist. The PD system might take care of all this within a tick, but generating pre-emptive counter-torques all at once might be simpler and provide better results.

Playing Back Motion-Capture Data

Using the above formulas, the character performs motion capture animation in a dynamic environment. Essentially, an invisible model (the rag-doll) is animated by the game code according to the visible character skeleton that might be driven by mo-cap data. Instead of rendering the visible model using mo-cap alone, the game is tricked into rendering the rag-doll model, by interposing a character motion process in the game loop just before collision detection and rendering phases. To do this, a target position and orientation for every body part in the rag-doll is computed by analyzing the position, orientation, and pose of its "invisible" target character model as it arrived from the game loop. Then, external forces are computed and applied to the rag-doll's body parts to move and rotate them independently to their target positions in the mo-cap pose. The physics engine is called, to execute a physics time step, allowing the rag-doll's body parts to move to their target positions (assuming no collisions occur). Where the rag-doll is a simplified skeleton, the movement and physics steps are easier.

The outputting of character state back to the game system for rendering and further processing might be done by overwriting the memory used by the game system for character state.

Position and Orientation Feedback

The issue of the invisible skeleton getting further and further away from the graphical skeleton can be dealt with using position and orientation feedback. For instance, when the graphical skeleton's pelvis does not arrive at its target position due to collisions or strength limits, then the position it does obtain is fed back to the character, so that the character's position will be adjusted accordingly. The pelvis' orientation is handled similarly.

This feedback might be limited to where the feedback is only performed if the differences between the position and orientation are greater than a certain threshold.

Locomotion Feedback

Another form of useful feedback to the animation system is the player's velocity. If the animation system thinks the player is running, it will keep playing a running animation. However, if the player's rag-doll is stuck and has stopped making forward progress, the animation system needs to adjust to a walk or a standing pose. Conversely, if the player is standing, but the rag-doll is moved due to collisions, the animation system needs to start making the player take steps, since it is now moving.

Joint Angle Feedback

Currently the orientation of every skeletal joint with a corresponding constraint in the rag-doll is fed back to the character, but only for the sake of rendering, so that the rag-doll's pose is rendered rather than the target pose.

Strength Constraints

As touched upon above, when a mo-cap animation is deviated from due to the application of external forces (but not enough for a motion supervisor to turn away from the mo-cap mode), the current pose deviates from the target pose defined by the mo-cap data and when the actual external forces are removed, it is possible that superhuman force is exhibited for a character to move back to its mo-cap path following a deviation caused by a collision or other variance event. For example, where a body part is moved off track or a character is in a different location due to a collision, once the added external force is removed (the body part is no longer impeded or colliding characters separate), the parts immediately move at high velocity to obtain their desired target position and pose. This often results in an exhibition of super-human speed and strength.

To avoid this, strength constraints are placed on movements, so that body parts cannot accelerate faster than is natural. The character states might include the current pose and location of a character as well as the character's current target position. In the simple case, the character's current target position is what is indicated by the unmodified mo-cap data. The difference between the two positions would be due to strength constraints and eventually (if the character stays in a mo-cap following mode) the two positions would align.

Where invisible skeletons are used, the invisible skeleton could operate with no constraints and always be at the target pose and location and have spring forces connected to the graphical skeleton whose position is used for rendering the character. The strength constraints might be implemented as array of force and torque limits added to each rag-doll's data model, with values adjustable on the fly. When the force and torque are computed to move a body part, they are clamped by the current limits for that part before being applied.

In some cases, strength constraints produce artifacts, by parts overshooting their target mo-cap poses after a collision and showing springiness. In part this can be caused by parts accelerating over several frames and the strength constraints preventing the body part from slowing down to the target pose before it passed the target pose. To address this, extra steps add a damping force or velocity limits. Preferably, the available strength is large enough to overcome the maximum velocity in a single tick.

Similarly, a body part can be assigned a maximum angular velocity, beyond which it will not be accelerated by the external forces used to pose the rag-doll. Methods for adjusting these maximum angular velocities per body part are described below.

Invisible Skeletons

Using a hidden skeleton, a character comprising a plurality of body parts is attached to an invisible skeleton of at least mostly corresponding body parts. The invisible skeleton does not show up in rendering, but exists and moves as driven by motion capture data. The character that is rendered has its body parts limp and connected by springs to corresponding body parts of the invisible skeleton. This way, the character is animated according to forces applied by the springs rather than trying to fit to a position indicated by the motion capture data. Interestingly, this spring system can be used for dynamic situations using motion capture data.

As an example, suppose the character was a soccer player and was animated to run down the field. If the motion capture data is for an animation without a collision, but in the game the character is bumped by another character, a rule could be that the character is bumped by forces from the other character colliding, but the invisible skeleton is not impacted by the collision and continues along the path (i.e., a sequence of poses) specified by the motion capture data. Immediately following the collision, the character is in different positions relative to the skeleton, so the spring forces increase. Following the collision, the spring forces gradually (or at least realistically) urge the character back into the poses currently determined for the invisible skeleton.

Of course, with this approach, the stiffness and damping of the springs should be adjusted so that recovery from a deviation from a mo-cap path looks natural, without too much lag and too much jiggling as body parts attempt to spring back into position. In some cases, more than one spring per body part might be used, so that parts move back into proper orientation as well as the center of mass (or other spring attachment point) moving back into position.

In a refinement, a more complex "smart linear" spring is used instead of a simple "force=displacement distance" spring. With such a spring, the force exerted is not necessarily proportional to the displacement distance, but is set at whatever force happens to be necessary each tick (one tick per frame, but other scales might be used instead) to move each body part into its desired position in a single tick. In addition to forces between a character body part center of mass and the spring attachment point on the invisible skeleton (centers of mass or otherwise), torque force might also be included. Torque forces might be provided by angular springs.

With smart angular springs, the rag-doll engine (which can be implemented as sub-processes of a character movement engine) computes, for each body part/bone, its desired orientation relative to its parent joint (from the mo-cap driven skeleton), and then torque values are computed for each bone in the physical model to make each rag-doll bone achieve that same orientation relative to its parent bone.

In one implementation of smart linear springs, the rag-doll engine computes a distance that a particular body part is to move between the previous frame and current frame (the desired distance). This can come from the mo-cap data for the body part. There, the rag-doll engine computes the velocity to move over that distance in the allowed time step and computes the acceleration needed to obtain that velocity. From that, the rag-doll engine can compute the force needed to obtain that acceleration. Thus, the rag-doll engine can compute the force needed to move the body part to its next position as indicated by the mo-cap data.

Angular "Smart" Spring Computation

Computing the torque necessary to set orientations for each body part to the destination orientation can be done using a rag-doll engine program as described below. As an example, the rag-doll engine might be configured to compute the exact angular velocity w (Vec3T) that that will rotate a body part from a starting orientation s (QuatT) to a destination orientation d (QuatT) in a single time step of duration t (seconds), given s, d, and t. This angular velocity might then be fed forward to the physics engine that will perform a forward integration using these steps:

$$z=\text{makeQuaternion}[w,0]; \leftarrow z.x=w.x; z.y=w.y; \\ z.z=w.z; z.w=0 \quad (1)$$

$$d=s+((z*s)*(t/2)) \leftarrow \text{based on the fact that } ds/dt= \\ (z*s)/2 \quad (2)$$

$$d=\text{quatNormalize}(d).$$

The problem of calculating the w that would give the right value for z that would give the right value for d might be hard, because there is no easy inverse for the quatNormalize( ) in step 3 above. However, by ignoring the quatNormalize( ) function and solving the equation in step 2 above for z, the result is:

$$z=((d-s)*(2/t))*\text{quatInvert}(s). \quad (4)$$

If quatNormalize( ) was inverted, z.w would always come out zero. However, by temporarily ignoring that step, z.w does not come out zero, and the rest of z is also off by a scale factor. As it turns out, the scale factor is easily determined, as shown in step 5 below:

$$\text{scale}=1.0f/(1.0f+(z.w*t*0.5f)) \quad (5)$$

$$z.x^*=\text{scale}; z.y^*=\text{scale}; z.z^*=\text{scale}; z.w=0.0f; \quad (6)$$

Thus, the final solution can be derived by the calculation in step 4 above using d, s, and t and then calculating the scale in step 5 to fix the output z, then finally, the w vector can be extracted from the first three fields of z.

Intermediate Target Pose

In addition to being used to deal with strength constraints, intermediate target poses can be used where the interrelationships of body parts deviate from their mo-cap target poses. For example, if a torso is knocked out of position, the connected head might have an associated force that is strong enough to force the head back into its original position in the world space, which can be a considerable distance.

In the simple case of having two poses per character, one being the target pose coming from an animation system positioned according to the mo-cap data and the rag-dolls current pose that takes into account dynamic force effects, such as collisions. Intermediate target poses were introduced above as a mechanism for spreading the pose recovery over more than one frame, and can also be used to deal with motion of child body parts when their parent body parts are off target.

For the second use of the intermediate target pose, the strength attributed to body parts is used to attempt to maintain their angle relative to their parent rather than trying to move to their world space position in the target pose. For instance, when the torso is bent forward, the head just goes with it keeping the same relative angle, rather than being forced to snap backwards toward where it would be if the torso were straight up.

In some variations, yet another consideration comes into play, in that body parts being forced back to their mo-cap positions by the virtual forces calculated based on the mo-cap data has an effect on attached body parts. For example, the virtual force to move arms back into place might exert a net force on the torso, which is not correct. To deal with this, an intermediate pose can be generated that takes into account the intermediate positions of parent body parts in determining where child body parts will be.

One approach to constructing an intermediate target pose is as follows. First, the intermediate pose is initialized with the motion capture pose. This is all that is needed in the simplest case. Next, a loop is performed over all of the body parts, working from the pelvis (or other root body part) outward. Each part's parent is processed (once) at some point before the part itself. A preliminary target position for the part is generated. The target positions for the legs and pelvis are derived from the world space mo-cap pose, which helps the feet stay stuck on the ground in the proper place and helps the pelvis and legs stay vertical. The target positions for the torso, head, and arms are derived relative to their parent part's intermediate target position and orientation, previously computed using this same process. Then, the strength required to move the part to its preliminary target position is computed, taking into account its current momenta as well as orientation and position. Depending on how much strength is required, and how much strength is available, a final target position is stored into the intermediate pose for the part. This is a guess as to where the part should end up after applying its strength. If the guess is too small, it will result in some minor lost strength. If the guess is too big, it will result in a small angular error in the child's target orientation, but this should work well. In complex variations, other steps might be added, such as adding rules to help guide motion.

Once a part gets knocked off of pure mo-cap motion due to a collision or other deviation, the strength and velocity constraints might be lowered so that recovery happens over several ticks, instead of instantly returning in a single tick. The character state might also include the number of ticks since a body part needed to deviate, in case a process of recovery wants to operate based on how long recovery is taking.

Rag-Doll Processing in the Game Loop

The above refinements result in a single clump of rag-doll processing, performed in one logical step. In one embodiment, it executes near the end of the game loop, followed only by collision detection and rendering. The high-level process can be described as follows:

```
loop over all dolls
{
    Rag-dollCaptureMoCapPose( )
    Rag-dollGenerateIntermediatePose( )
    Rag-dollForceTowardIntermediatePose( )
}
Rag-dollRunPhysics( )
loop over all dolls
{
    Rag-dollMeasureError( )
    Rag-dollAdjustStrengths( )
    Rag-dollUpdatePlayerFromRag-doll( )
}
```

Rag-doll update occurs at the end of the game loop, after determining each character's pose and position, and just before the game loop's collision detection and rendering. Each character that has a rag-doll captures that character's current position and pose into its rag-doll data structure (the data structure might be represented by a set of Euler angles for each joint). The rag-doll process applies forces and torques to every rag-doll part to attempt to get the rag-doll to move to the desired pose within current strength/speed limits. Rag-doll physics is executed in a step, where the forces and torques act on the rag-dolls and they move the body parts to their new positions (with constraints and collision response applied). If any collisions occur during the physics step, the strength/speed limits might be lowered for the affected body parts several future ticks, so that the parts will respond to the collision impulse and slowly move back to their desired poses over a few frames in a naturally appearing manner. Each character with a rag-doll is then updated from its rag-doll model, which forms part of the character's state. Joint angles are copied from the rag-doll back to the character structure (these can be quaternions, e.g., four floating point values), and the root joint of the character may be updated also (orientation/position) from the rag-doll if necessary, such as if they differ beyond a tolerance threshold.

Whether or not to feedback the results can be decided by considering "strength" constraints and the intermediate target poses. Thus, very slight differences can be ignored and the game can run unaffected. These slight differences might result from the nature of working with floating point numbers, converting the pose into forces/torques, and mapping back and forth between the graphical skeleton and the rag-doll skeleton.

The application of forces and torques to rag-doll parts will now be described in more detail. Each body part is handled independently. First, a destination orientation and position is computed for each part. This might just be the destination position and orientation of the body part in the character as it was provided to the rag-doll engine. The torque and force is computed that would get each body part to move to exactly the destination position and orientation in one tick, given its current physical mass/inertia, position/orientation, and linear/angular momentum. This can be done using the "smart linear" and "smart angular" spring systems described elsewhere herein. The computed forces and torques might be clamped based on constraints set per body part that might simulate muscle strength. The forces and torques are also adjusted such that the body part will not be accelerated to an excessive speed—these speed limits might be set per body part and lowered temporarily when collisions occur. The adjusted forces and torques can then be applied to the body parts for the time step using the physics engine.

Some adjustments might be needed, such as to take into account that child body parts might contribute phantom forces and torques to parent body parts. For example, with a human character, if a collision moves a torso out of position, the arms and head might also move out of position and then by trying to return to their positions determined without collision, the arms and head would exert forces on the torso, making the motion look incorrect.

Instead of using strength to control the blending through the physics engine, a more controlled, but slightly more difficult implementation might be used. Starting from the pelvis body part (or other root body part) and working out to the children body parts, the rag-doll engine can compute a desired destination for each body part based on (1) the current position/orientation of the rag-doll, (2) the current mo-cap position orientation of the character, (3) some strength and speed limits, and (4) a set of heuristics.

The Physics of Posing During Free-Falls

Additional aspects and benefits include physical joint controllers to pose a model during free-fall, use of high-level motion supervisors, generating falling motions, and techniques for getting up after a dynamic fall.

External forces violate conservation of momentum—they not only pose the rag-doll, but also affect the path of the doll. During falls in a dynamic environment, the overall path of the rag-doll should be determined and not dictated by an animation. One approach to make falling look natural is to pose the doll during falls using only internal forces, that is, forces that are internal to the doll system itself (i.e., joint servos). This allows the doll to correctly fall, bounce, and lay in a dynamic environment while still being able to control its joints. In this mode, any torque applied to one side of a joint is accompanied by an equal and opposite torque on the other side of the joint, thus conserving momentum.

Proportional-Derivative Controllers

Proportional-Derivative (PD) controllers provide a simplistic method for avoiding the complexity of computing an exact solution. PD controllers are widely used in robotics and in many other diverse applications (i.e., climate control).

A standard PD controller basically acts like a spring-damper. The term "proportional" refers to the controller outputting a torque that is proportional to the distance that the joint is currently away from its target position (like a spring). The term "derivative" refers to the controller outputting another torque that is proportional to, and opposite the speed that the joint's angle is changing (like a damper).

In order for a PD controller to successfully playback typical locomotion mo-cap (i.e., running), the time resolution of the physics steps might need to be smaller than a frame resolution to make locomotion look correct. However, using strength constraints and a number of other techniques, suitable results can be obtained.

A typical technique for computing the PD controller output for each joint begins with computing an angular error, e, as a vector, with its direction being the axis about which the joint needs to rotate and its magnitude is the distance to rotate in radians. As inputs, q is the current orientation of the child part (quaternion), d is the target orientation of the child part (quaternion). The variable s is a temporary (quaternion).

$$s=((d-q)*2)*q-1$$

$$e=\text{vector3}(s)*(1/(1+(s.w*0.5)))$$

The controller's proportional gain constant, P (scalar), is then used to scale the error vector into a torque vector, t.

$$t=e*P$$

Next the derivative term of the controller is computed by obtaining the angular velocity of the child body, w, scaling it by the derivative gain constant, D (scalar), and the result is added to the net output torque, t. For us, D is negative, to oppose the joint's velocity. Note that using the rotation rate of the joint for w would be more accurate.

$$t+=w*D$$

This final net torque, t, is clamped by the joint's maximum strength. Then it is applied to the child body of the joint. The equal and opposite torque is applied to the parent body of the joint, simulating a servo motor.

PD controllers can be somewhat tricky to tune. The goal is to find the gain constants (P and D) that will move the model to a target pose quickly and without much overshoot. This PD tuning task is done for each joint. In one approach, the P constant is slowly ramped up until it allows for following rapid mo-cap movements, and the D constant is simultaneously ramped up as necessary to eliminate wobbles due to overshoot.

A more complex PD controller might be used that can correctly position body parts with one physics step per frame. Although it might not accurately follow very rapid mo-cap motions such as running, it does work well for posing the character during falls, dives, and getups.

This complex controller computes the exact torque necessary to rotate a free rigid body from one orientation to another, in a single physics step, taking into account its existing angular momentum, but first the destination orientation is altered to be short of its target orientation so that when the torque for the joint is applied twice, once to the child and a second time to the parent (equal and opposite to keep the force internal), it ends up in the target orientation. Due to velocity considerations, this is different than just dividing the computed torque in two. An example of such a process to compute a joint's torque is as follows:

$$d'=QuatSlerp(q,d,½)$$

$$s=((d'-q)*(2/t))*q-1$$

$$w'=vector3(s)*(1/(1+(s.w*t/2)))$$

$$t=Iworld*(w'-w)/t$$

In yet more complex embodiments, both bodies' rotational masses and velocities connected by the joint are considered.

High-Level Motion Supervisors

In dynamic environments, unscripted events may occur which require an action to be taken, such as a character being tripped while running according to a mo-cap path, in which case motion should move off of the mo-cap path and onto a falling animation. If the fall is itself scripted by mo-cap data, but the character is pushed off-path, motion might move off as well. If there are other interferences or external effects, such as a football player being under other football players, the mo-cap motion might not be followable with natural-looking results. In yet other cases, a transition might be needed between a dynamic mode and a mo-cap mode.

In such cases, motion supervisors monitor events and states to indicate to a character motion generator that the mode under which a character is animated has changed or should change. In a specific embodiment, four high-level motion supervisors are used. Each one specializes in supervising a certain type of motion. These motions include locomotion, falling, getting up, and staying down (i.e., on the ground or in a pile).

The mode supervisor has several sub-states and can be modeled as a finite state machine. For example, the mode supervisor could set the mode to be a normal mode of mo-cap data plus collisions. The character will then follow the motion and pose contained in the mo-cap dive/fall using external forces or a combination of external and internal forces. If no unexpected contacts (or only minor contacts) occur, the motion will be very natural and follow the mo-cap nicely. However, the mode supervisor should detect when those conditions are not present and switch modes. For example, once a large contact (or a large number of them) occurs with other characters (or a character), the mode supervisor changes the mode to a free-fall mode (internal forces only) to allow the overall motion of the character (e.g., position and orientation on the field) to come from physics, but the pose (e.g., position and orientation of skeletal joints) to come from mo-cap.

If in a free-fall mode and the orientation deviates too much from the mo-cap pose, the mode supervisor might switch to a dynamically generated pose mode (or pick a different animation overall). Once the character appears to have come largely to rest in contact with other characters, the mode supervisor can switch to a "lay in pile" mode, wherein the character movement engine attempts to conform the character's pose to the pile, holding in place as much as possible in as stable as possible manner.

Game logic is executed by a game engine (or other component) to select the active supervisor(s). For example, when any player assignment in a sports game is started, a locomotion supervisor is activated. Special assignments, such as the "get-up" assignment, "fall" assignment, or "stay-in-pose" assignment, might trigger a specialized corresponding supervisor.

A motion supervisor might signal mode changes by toggling or changing bits in a character state that informs the behavior of the rag-doll being supervised. In an example for a team sports title, the mode flags might include:

FREEFALL—When enabled internal forces are used, otherwise external forces are used. This is enabled for falls, dives, and get-ups and disabled for normal locomotion.

GETUP—This flag indicates that a little extra external force should be applied to help the doll actually get up during a get-up animation (when in FREEFALL).

NOJERK—This flag causes the target pose to slowly transition back to mo-cap instead of snapping to it. This is used when transitioning from a dynamic fall to a getup pose.

DYNFALL—When enabled, the system overrides the source mo-cap animation with full, dynamically generated motion for a fall.

Motion supervisors can also control the maximum torque strength available at each joint. This is used as a primitive method to control how much effort the doll may exert to follow the source animation. For instance, when falling, a doll is restrained to about half the maximum strength of when running, to help absorb the blow of crashing into the ground. When staying down, the doll uses only a small percentage of its maximum strength, to help it conform to the ground or player pile and to help conserve energy. When getting up, the doll has nearly all of its available strength on standby, to help lift off other players if necessary.

Each tick, the current torque limit at each joint is ramped towards its target, which is set by the motion supervisor. This ramping helps avoid motion snaps due to rapid changes in available strength.

The locomotion supervisor is activated by default whenever any player assignment is started. It clears all of the rag-doll mode flags. This causes the rag-doll to follow the target poses and positions provided by the animation system, using external forces and torques. During execution, the locomotion controller performs a rough balance check of the player. If the player is deemed to be too far out-of-balance then the supervisor triggers a fully generated dynamic fall.

When the player appears to have lost balance the locomotion supervisor might trigger a dynamic fall by clearing the player's current assignment queue and setting the rag-doll's DYNFALL flag to cause the fall supervisor to generate the falling motion, instead of following mo-cap animation, once it gets control.

An example of a balance check works as follows: (1) the center-of-mass positions of the pelvis and the torso are averaged together to form a rough estimate of the player's center-of-mass; (2) a support circle is constructed based on the positions of the center-of-mass positions of the player's shins or feet, if present; (3) the distance that the center-of-mass position is outside of the support circle, once both are projected onto the ground plane, is returned to the caller; (4) finally, the supervisor decides the tolerance. If the player seems out of balance, it then does a sanity check by comparing the physical model to the source animation. If they are in agreement, then the out-of-balance condition is ignored, otherwise it is processed.

The falling motion supervisor is activated whenever a fall or dive assignment is started. It normally keeps the rag-doll closely following mo-cap animation using external forces. However, if the DYNFALL flag is set indicating a dynamically generated fall is desired, it immediately puts the rag-doll into the internal forces free-fall mode and generates the target motion itself.

During supervisor execution there are two cases. In the first case, if still following mo-cap, the model's orientation is compared to the target orientation coming from the animation system. If the model ever significantly deviates from the animation due to collisions, then the supervisor switches to a generated fall. To switch from mo-cap to generated motion, the supervisor sets the FREEFALL mode flag in the rag-doll, switching it to internal forces mode, stops the current mo-cap animation and sets the DYNFALL flag in the rag-doll indicating that the fall has now become dynamic. In the second case, once a fall becomes dynamic, the supervisor generates motion for the character's joints and completely ignores the target pose coming from the animation system.

The get-up supervisor is activated whenever a get-up assignment begins. It immediately sets the FREEFALL, GETUP, and NOJERK modes of rag-doll operation. FREEFALL mode is required because this player may be lying on top of another player or end up being lifted by another player also getting up. For these reasons, external forces do not work well for driving get-ups. The GETUP flag enables some external forces and torques to be applied to the pelvis to help the model actually stand up during the get-up. These forces are slowly ramped on during the get-up, and only lift the model and help orient it to match the animation. The joint posing is performed using internal forces to allow the model to be lifted, dropped, or twisted naturally during the get-up. The NOJERK flag helps the model transition from a dynamically arrived at pose back to the mo-cap animation for the get-up. While this flag is set, the doll's target pose is slowly blended towards the mo-cap poses coming from the animation system using quaternion based blending. This mode is ramped off during the get-up until it has no effect, at which point the flag is cleared.

The get-up supervisor performs two basic roles. First, if the doll appears pinned or unable to proceed, the target mo-cap animation is paused until the situation improves. Second, if the get-up process appears to be badly failing (for one of many reasons) it causes the player to fall again. When the fall completes, another get-up will be attempted.

The supervisor closely monitors the joint errors of the waist, hips, and knees. Depending on the height of the pelvis, it expects these errors to be within certain tolerances. If any of these joints are outside the expected error tolerance then the get-up is deemed to be off track. Whenever this happens, the mo-cap animation driving the get-up is paused—and the rag-doll then keeps attempting to reach the current frozen pose. Once the errors are reduced to within tolerance by the doll's efforts, the animation is resumed. If the animation is not resumed within a time limit, the supervisor bails out by triggering a dynamic fall, the same way that the locomotion controller does when the player is out-of-balance.

The get-up supervisor might also have access to information about external contact forces pressing downward on the player. Summing these weights, the animation will delay if they exceed a threshold, until the offending weight is somehow removed from the player.

The get-up supervisor may abort the get-up assignment by triggering a dynamic fall in certain conditions, such as if the feet are too far off the ground, the doll's pelvis orientation becomes many degrees away from the animation or the like.

The stay down supervisor is activated whenever a stay-in-pose player assignment starts. The FREEFALL and NOJERK modes are immediately enabled. FREEFALL mode allows the player to lie nicely in a player pile, to be lifted or dropped, or to be rolled around. The NOJERK mode helps prevent the target pose from snapping after a dynamic fall led to the stay down assignment.

The stay down supervisor generates motion for the player while it is staying down. This is necessary in case the doll is dropped, rolled, or otherwise manipulated by external contact while it is staying. It uses the same routines that generate the falling (protective) motion during dynamic falls.

The stay down supervisor also periodically updates the get-up pose stored in the associated player, based on the player's orientation. This is necessary so that the proper get-up animation will be selected whenever the stay-in-pose assignment ends, even if the doll gets rolled around during this assignment.

Motion supervisors might be data driven, such that the animations themselves select an appropriate supervisor. Supervisors might even be created dynamically from data in animations. Animations could add or remove rules to a supervisory system as needed, as well as set and clear rag-doll mode flags as needed. This would allow highly customized supervisors to be created as part of any animation. Animations might add/remove supervisory rules on the fly. A rule might comprise an expression along with an action to trigger if the expression evaluates to true. Available inputs to the rules could include available rag-doll related data, such as current joint errors, contact forces, heights of body parts, results of a balance check, linear and angular velocities, etc. Supervisory actions could include actions such as clearing all rules in effect, clearing a rule by unique ID, triggering a dynamic fall, pausing the animation, resuming the animation, setting or clearing mode flags, setting a joint torque limit, or generating falling motion. These are the kinds of actions produced by the current supervisors.

An alternative is to use hard-coded supervisors with data-driven thresholds or options. For instance, a system might provide a fixed set of hard-coded supervisors but allow the selection to be driven by animation states and also allow some of the thresholds and other key decision points to be provided by the animation data.

During the flight portion of a dive or fall, a player may easily get pushed away from the target mo-cap animation. When this happens, it might be possible to switch to a different animation that more closely matches the situation. This would work best if the new animation is only used for posing the character, and not for guiding its motion. Such an animation might be selected based on altitude, orientation, and angular velocity.

One way to do this effectively is through the use of mo-cap or reference poses as key-frames. For example, during falls, player arms are mainly used to help protect the body (or the ball). Using reference poses for the left arm breaking a fall along each axis of the torso, with each arm pose comprising Euler joint angles for the shoulder, elbow, forearm, and wrist, this can be used for natural-looking animation.

A generated pose is constructed by forming a weighted average (quaternion blending) of these reference poses. The weight for each pose is calculated by a simple dot product between the ground direction and a direction associated with the pose (clamped greater than or equal to zero). The result of the blended poses is converted back to Euler angles, and used to overwrite the joint data coming from the animation system. The effect is that the arm interpolates between reference poses and dynamically protects against the ground coming from various angles as the body rotates.

When processing the right arm, each source pose is reflected across the y and z axes, allowing the left arm pose data to be reused for the right arm. A player skeleton is built to support this operation.

Care is taken to ensure that the limbs are not moved too quickly. An angular speed limit per joint is enforced when overwriting the joint angles. When necessary, a spherical interpolation is used to keep the joint speed within reasonable limits.

Leg posing works similarly, except that only two reference poses are used. One is weighted for the player's back to the ground, and the other is weighted for the player facing the ground. During falls, the legs mostly just follow the body, and are often overpowered by collisions and their own momentum. Leg poses typically become most important near the end of the fall, helping stabilize the player while guiding into the get-up pose.

For the spine, two useful poses exist to blend between. The spine comprises three joints inside the torso and two neck-related joints. One of the poses has the spine fairly straight, useful for diving and lying on the ground. The other pose has the spine in a fetal-like position, bent forward, useful for summersaults and covering up.

If the player's back is toward the ground, or the player is low to the ground, prefer the straight pose. If the player is facing the ground, traveling rapidly, and off the ground, prefer the fetal position—this typically kicks in during the initial part of a forward fall due to a trip or push, and greatly improves the results.

Using a combination of these poses, natural-looking animation can be done. Thus, one predetermined upper body pose might be combined with one predetermined lower body pose. The combination of those poses is then used as a target pose for the character.

Motion Supervisor Execution

After the rag-doll physics executes, the active motion supervisors examine the states of their dolls. As part of this process, measurements are made to determine how far the body parts and joints are from their target positions. The supervisor takes action if necessary, such as adjusting joint strengths, toggling mode flags, or triggering game AI into new states. This is also where any generated motion is computed, to be used as joint angle targets during the next iteration of the game loop.

Supervisory processes might implement dynamic controllers. A dynamic controller directs motion during the applicable mode and uses rules to determine supervisory process controls. For example, while a character is running, a rag-doll/mo-cap supervisor might control motion, but when the character is hit and off the ground, a ballistic controller might take over control of the character's motion. Supervisors for a given character might need to take into account the other characters in a scene, so that interactivity can be taken into account.

As an example of supervisory transfer, a supervisor might determine that the character is too far off of its mo-cap target and instead is in a freefall mode. In that case, the mo-cap targets would not drive the character's motion, but an internal-forces freefall mode might be entered. Falling might be determined by checking for balance and starting a falling mode when the character is off balance.

For multi-player animations, the supervisor for each player might need to be made aware of the other players in the scene (decisions/aborts might not be able to be made/performed in the supervisor looking at one player at a time). During multi-character animations, information is required by the supervisors to be able to abort the animation if the players cannot get into position to initiate the wrap due to collisions with other players, trips, etc.

Updating the Graphical Model

A final step involves mapping the physical model back onto the graphical model for rendering. The position and orientation are measured and used to adjust the graphical model's position and orientation. Then, the resulting pose of the physical model is measured and copied into the graphical model's skeleton.

Rag-Doll System Components

Figure 6:
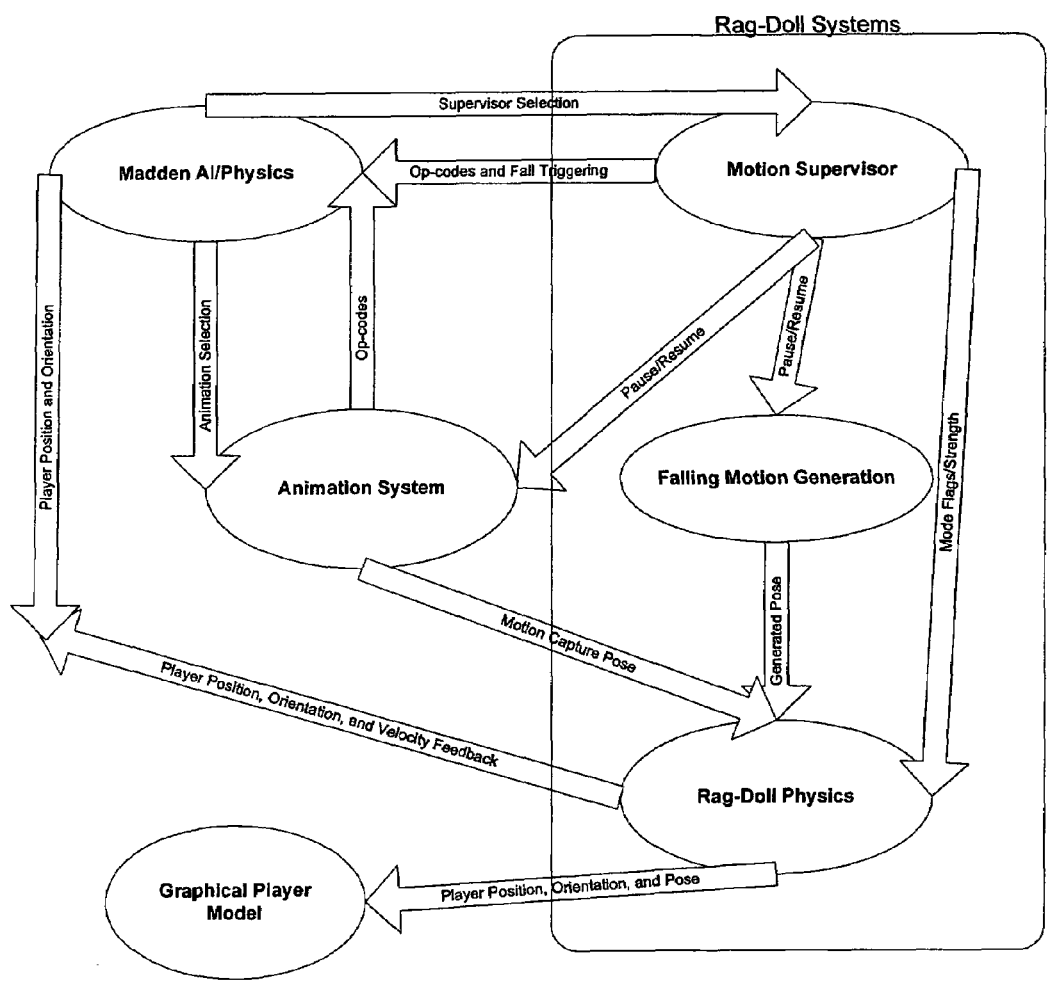
FIG. 6 illustrates an arrangement of components in an animation system.

FIG. 6 illustrates another view of the main components involved with the rag-doll processing in some embodiments, and how they interact. Many of the connections shown are accomplished through shared data or defined APIs. For instance, the animation system might not know about the character motion engine added later, but the character motion engine and animation system can communicate if the character motion the engine knows how to access mo-cap poses via a buffer embedded in a player's data.

Additional Variations

In a game, some characters can be driven using rag-doll models while others are not. For example, in a football game, all of the characters on a field might be rag-doll modeled, but in other embodiments the referees, coaches, cheerleaders, etc. are not.

Characters might have varying masses and varying strength constraints.

To make motion more natural and avoid physics engine artifacts, artificial damping might be included (such as by telling the physics engine there is a large air friction) or artificial increased gravity (e.g., 15 m/s/s instead of 9.8 m/s/s).

An AI engine might be used to handle more complex interactions, such as players anticipating hits and reacting before collision, such as reacting to a pile before running into it.

Being able to move the rag-doll from any current pose to any desired destination pose using only forces and torques, dynamic collision response in a mo-cap controlled character can be done using the character movement engine. When deviating from the mo-cap controlled pose/position, the character movement engine might signal other elements of the game code of the change, so that the process uses the correct position/orientation not the assumed position/orientation. Such other processes include an animation system, game simulation (e.g., where the character ends up in relation to other characters), game-play rules, etc. For example, if a collision varies a football player's position on the field to be out-of-bounds where the uncollided mo-cap data would have kept the football player in bounds, a game-play system should be notified so that it can follow the rules that apply to out-of-bounds movement.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. In a computerized image rendering system, wherein images are generated based on a geometric model of simulated or actual objects such that the images, when displayed on a display device, represent a view of the simulated or actual objects forming a scene, the geometric models being in an electronically readable form readable by the image rendering system and the images generated being in an electronic form readable by a display system, further wherein the images represent a sequence of movements from frame to frame of the simulated or actual objects, a method of generating the images comprising:

tracking, for a character to be rendered and comprising one or more simulated or actual objects organized as a plurality of body parts movable relative to other body parts, whether the character's movement is to be ballistic or non-ballistic;

when movement of the character is non-ballistic, computing forces in a non-ballistic mode characterized by external forces being predominant and applying those external forces to the plurality of body parts, thereby imbuing the character with non-ballistic motion;

detecting when movement of the character changes from non-ballistic to ballistic, wherein detecting when movement of the character changes from non-ballistic to ballistic includes:

performing a balance check on the character, the balance check comprising:

a) determining an estimated center of mass for the character by averaging together a pelvis center-of-mass position and a torso center of mass-position of the character;

b) constructing a support circle based upon positions of character's lower extremities;

c) determining a distance that the estimated center of mass is outside of the support circle;

d) comparing the distance that the estimated center of mass is outside of the support circle to a predetermined threshold; and e) signaling a change to ballistic motion, if the distance that the estimated center of mass is outside of the support circle exceeds the predetermined threshold;

when the movement of the character changes from non-ballistic motion to ballistic motion:

a) computing forces in a ballistic mode characterized by spring-like internal forces being predominant; and b) applying the forces to the plurality of body parts, thereby imbuing the character with ballistic motion;

calculating positions of each of the plurality of body parts in the ballistic mode for a current frame from at least the spring-like internal forces using an inverse dynamics process based on differences between joint angles of tracked body parts of the plurality of body parts tracked from a previous frame and a set of desired joint angles for the tracked body parts for the current frame as determined from motion capture data, the velocities of each of the tracked body parts and the masses of each of the tracked body parts, wherein the positions calculated are constrained by at least one joint strength constraint or joint velocity constraint; and generating the current frame using the new set of positions obtained after the application of the forces to the plurality of body parts.

2. The method of claim 1, wherein the inverse dynamics process comprises using proportional-derivative controller equations.

3. The method of claim 2, wherein the proportional-derivative controller equations include forces not constrained to be proportional to displacement distance, such that the forces are derived so that body parts move to designated positions after a specified time period.

* * * * *